United States Patent [19]
Fratello et al.

[11] Patent Number: 5,750,239
[45] Date of Patent: May 12, 1998

[54] PROCESS OF MAKING TRUE COPIES OF MAJOLICA TILES AND THE LIKE

[76] Inventors: Luigi Fratello; Michele Calocero, both of Via Caldarulo 2, San Mango Piemonte, Italy, 84090

[21] Appl. No.: 713,537

[22] Filed: Sep. 13, 1996

[30] Foreign Application Priority Data

Sep. 14, 1995 [IT] Italy .................. MI95A1907

[51] Int. Cl.⁶ .................................................. B32B 9/00
[52] U.S. Cl. .................. 428/195; 428/13; 428/28; 428/49; 428/67; 428/174; 428/187; 428/207; 428/542.2; 428/913.3; 264/245; 156/63; 156/240; 156/252; 156/297
[58] Field of Search .................... 428/28, 13, 67, 428/76, 68, 174, 187, 195, 542.2, 49, 79, 913.3, 204, 207, 246, 326, 914; 156/63, 297, 252, 240; 264/245

[56] References Cited

U.S. PATENT DOCUMENTS 4,125,653  11/1978  Muzik ........................ 428/40
4,584,218  4/1986  Travis ........................ 428/40
5,328,535  7/1994  Blanco ....................... 156/155

*Primary Examiner*—Patrick Ryan
*Assistant Examiner*—Abraham Bahta
*Attorney, Agent, or Firm*—Cushman Darby & Cushman Intellectual Property Group of Pillsbury Madison & Sutro LLP

[57] ABSTRACT

A process of making replicas of old, time-worn majolica tiles which look and feel like the replicated works. The process includes the steps of: (a) photographing the original work; (b) printing the photograph to obtain a trial print; (c) comparing the original work with the trial print; (d) making chromatic corrections to the trial print to enhance the faithfulness of replication (d') optionally reprinting the corrected print to obtain a second final print; (3) adhesively applying the final print onto a suitable packed support; and (f) finishing the edges of the packed support with a dye composition distressing the surface of the final print, both for enhancing the faithfulness of replication of the original work in the copy thus provided.

9 Claims, 3 Drawing Sheets

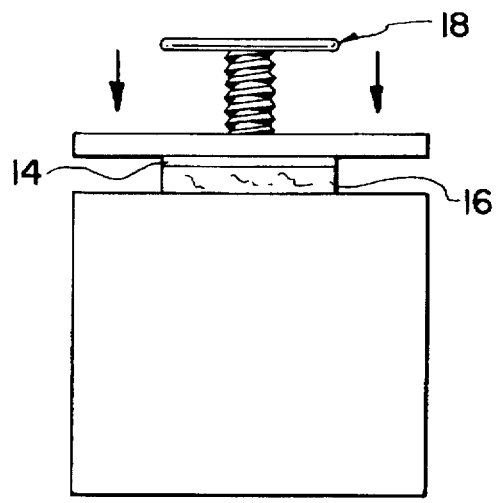
FIG. 3
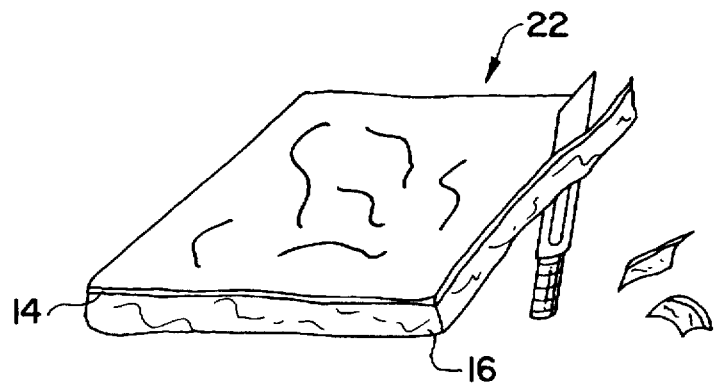
FIG. 4A
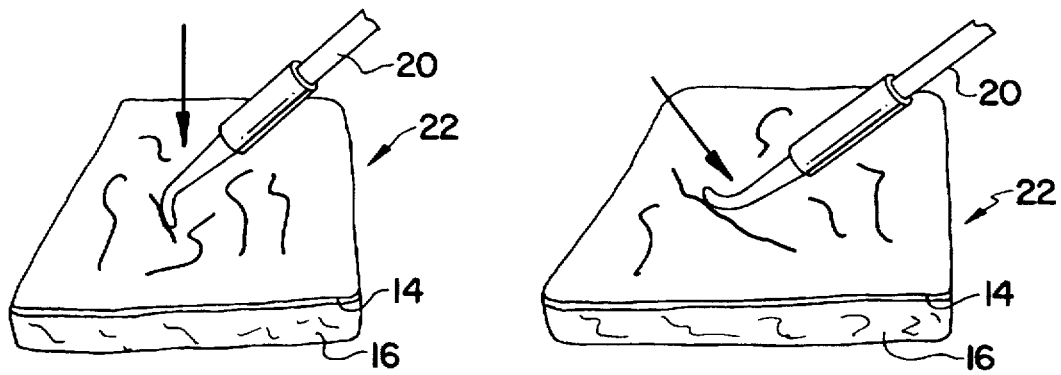
FIG. 4B
FIG. 4C

PROCESS OF MAKING TRUE COPIES OF MAJOLICA TILES AND THE LIKE

BACKGROUND OF THE INVENTION

1. Field of the Invention

The present invention relates to applied arts and more particularly a process to obtain visually and factually almost identical copies (as to drawing, color, size, tactile and optical surface characteristics) of majolica tiles, generally unique examples of historic and artistic interest.

2. State of the Art

It is well known that it is often impossible to reproduce faithfully in practice visually identical copies of majolica tiles with the traditional technique of using clay and glaze, because of the modifications of the surface of such tiles as has been caused by wear and time in the course of years.

It is also known to make photographic reproductions which are the same size as the original works, but succeeded in providing photographic representations of original works, with a three-dimensionality effect and to reproduce any surface defects, including those caused by wear and time in the course of years.

SUMMARY OF THE INVENTION

The process of the present invention may be used for applications in many fields, such as to make copies for museums (indeed it is well known that most majolica tiles are irremovable as they are generally fixed on the outside and a possible removal would irreparably damage them); decoration articles and furnishings; set design, fair, exhibition, trade show stands and stalls; preparation of art exhibitions by the Monuments and Fine Arts Agencies and so forth.

The object of the present invention is to provide a process by which it is possible to make copies that are in practice visually identical to old majolica tiles and the like for the above stated purposes.

BRIEF DESCRIPTION OF THE DRAWINGS

The process of the invention will be now described in greater detail, reference being had to the accompanying drawings, in which:

FIG. 3 is a schematic view of the gluing phase;

FIGS. 4A, 4B, 4C show various phases of the finishing stage; and

DETAILED DESCRIPTION OF THE PREFERRED EMBODIMENT

With reference now to the various figures of the accompanying drawings, the first phase of the process (Phase a) consists in making a photographic mapping of the article or subject 12 to be reproduced.

Figure 1:
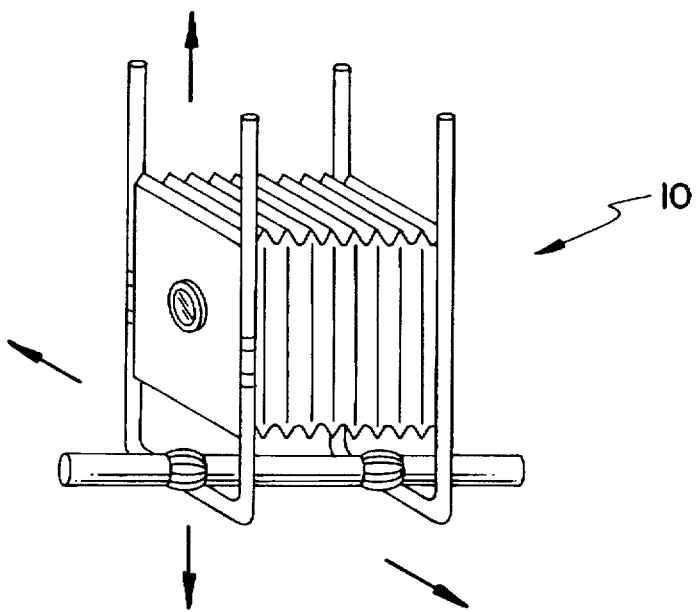
FIG. 1 is a diagrammatic perspective view of a photographic camera that can be used to carry out the process of the invention.

For this phase a photographic camera 10 of large size of the optical bench type is used, where the film plane and the optics plate can be moved both horizontally and vertically (FIG. 1).

Figure 2:
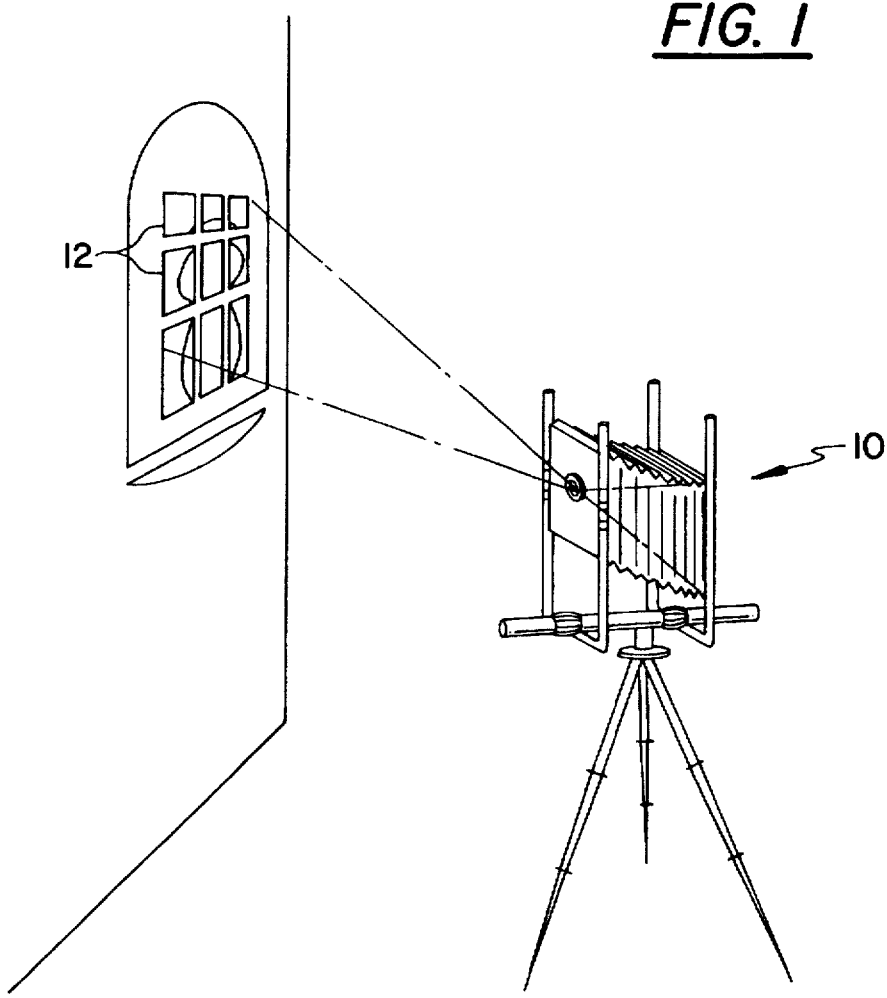
FIG. 2 is a schematic view of the phase of carrying out the photographic representation of the invention.

Use of such a camera 10 is necessary in order to keep an exact parallelism of the horizontal and vertical lines, so as to obtain a correct image from the orthogonal point of view. Most photographic mapping is indeed carried out generally on plaques or panels fixed on walls at a certain height, and this necessitates that one to move the optical system (FIG. 2).

Clearly, the majolica tiles or generally the subjects 12 to be reproduced, when they are constituted by several elements jointly forming a complex work must be photographed piece by piece, and then assembled again after the photographic reproduction of their appearance has been generated and printed.

The photographic shots are effected by using color negative sensitive material, and developed by a suitable process.

The subsequent phase (Phase b) is the printing one.

A suitable sensitized paper is exposed by using a magnifier with color head and projecting the negative on the plane with a magnification ratio of 1:1 in respect of the photographed original article. The sensitized paper used must show good characteristics of brightness, response to chromatic fidelity, surface reflectivity and resistance to wear.

After having obtained the trial prints (Phase b), it is necessary to return to the place where the shots were taken in order to compare (Phase c) the colors of the trial prints with those of the original article. After having noted any difference, and effected the corrections in respect of the chromatic rotations (Phase d), the final prints 14 (Phase d') are made.

At this point one proceeds to the subsequent phase (Phase e), which is constituted by the application of a suitable packed support 16 to the photographic prints 14.

Once the edges of the image are exactly trimmed, gluing on the support 16 is effected. The choice of the glue to be used is essential because it has to meet precise requirements. It is known that the photographic prints are polyethylene coated, an aggressive glue interacts with the polythenes of the print back and halos eventually appear on the photograph surface. On the other hand, less tenacious glues may have an insufficient grip.

After several tests, it has been established that it is necessary to use an acetone-vinyl glue of the kind adapted to join plastic supports with porous supports, like it is indeed the support to be described hereinafter.

The support 16 on which the photographic prints will be glued, is a flat, moldable support, and in its preferred embodiment it is constituted by a polypropylene panel. This is a material that can be easily trimmed with a common trimmer, is very light and its edges can hold a water based dye.

Gluing (Phase e) is preferably carried out by means of a mechanical press 18. After having spread a suitable glue on both surfaces to be joined, namely the upper (i.e., front) surface of support 16 and the lower (i.e., rear) surface of the final photographic print 14, these tow glue-bearing surfaces are contacted and then placed under the press (FIG. 3).

At the end of the setting time for the spread glue, estimated to be some hours, the finishing phase (Phase f) is carried out, comprising the steps of molding (Phase g) and dyeing (Phase h) of the edges, making possible depressions on the surface (Phase i) and reproducing of any faults, if such exist in the time-worn original being replicated (Phase l).

The reproduced majolica tiles are indeed subjects prevailingly going back to the 19th, 18th and 17th century; it is known that they were made in a size slightly exceeding the required dimension, and then they were reduced mechanically on the edges by means of special tongs. The characteristic scratches of this operation are reproduced manually on the edges of the replica during the molding step (Phase g) by using a trimmer in a position not at right angles to the surface (FIG. 4A). It is also preferable to make small sequential cuts on the edges.

The edges of the support used for backing the photographic reproduction (Phase e) are approximately white in this preferred embodiment. At this point of the process, it is necessary to dye them (Phase h) so as to cause the edge, as molded and dyed, to have an appearance and tatcual characteristic which are quite similar to those of terracotta. For this operation, after several tests, it was established to use a mixture comprising water diluted powdered stucco and water diluted brown colored acrylic dyed. The dyed stucco aqueous suspension so obtained is spread along the support edges with the aid of a common brush which has soft bristles.

The front surface of the tile replicas obtained by using the above described phases remains a perfectly flat surface at this stage. The original time-worn majolica tiles which are the subjects of these reproductions, on the contrary have surfaces of various structures and often show depressions, grooves and glazing faults.

All these details are made manually with a suitable metal tool 20 having one end shaped as a hook with rounded tip.

Indeed, the support 16 used in the process has the characteristic of keeping the deformations to which it is subjected. At the points where depressions or troughs must be obtained, pressure is exerted with the tool 20, using its tip for the dot-like faults (FIG. 4B) and its flat part for the major faults (FIG. 4C). As for the grooves, these can be obtained by dragging the tool tip along the line observed in the photograph, and exerting a correct pressure.

With regard now to the reproduction of the glazing faults (Phase 1), these faults must have such characteristics as to fully resemble the surface that is being replicated.

These faults are surfaces where glaze was lost, leaving the terracotta uncovered. After having circumscribed the areas to be treated by grooving them with the tool, and exerting a light pressure, these areas are coated with the same mixture that was used (in Phase h) for dyeing the edges, using a thin brush with soft bristles.

At this point, after a final drying step, the process may be considered to be complete, obtaining the replica 22.

Figure 5:
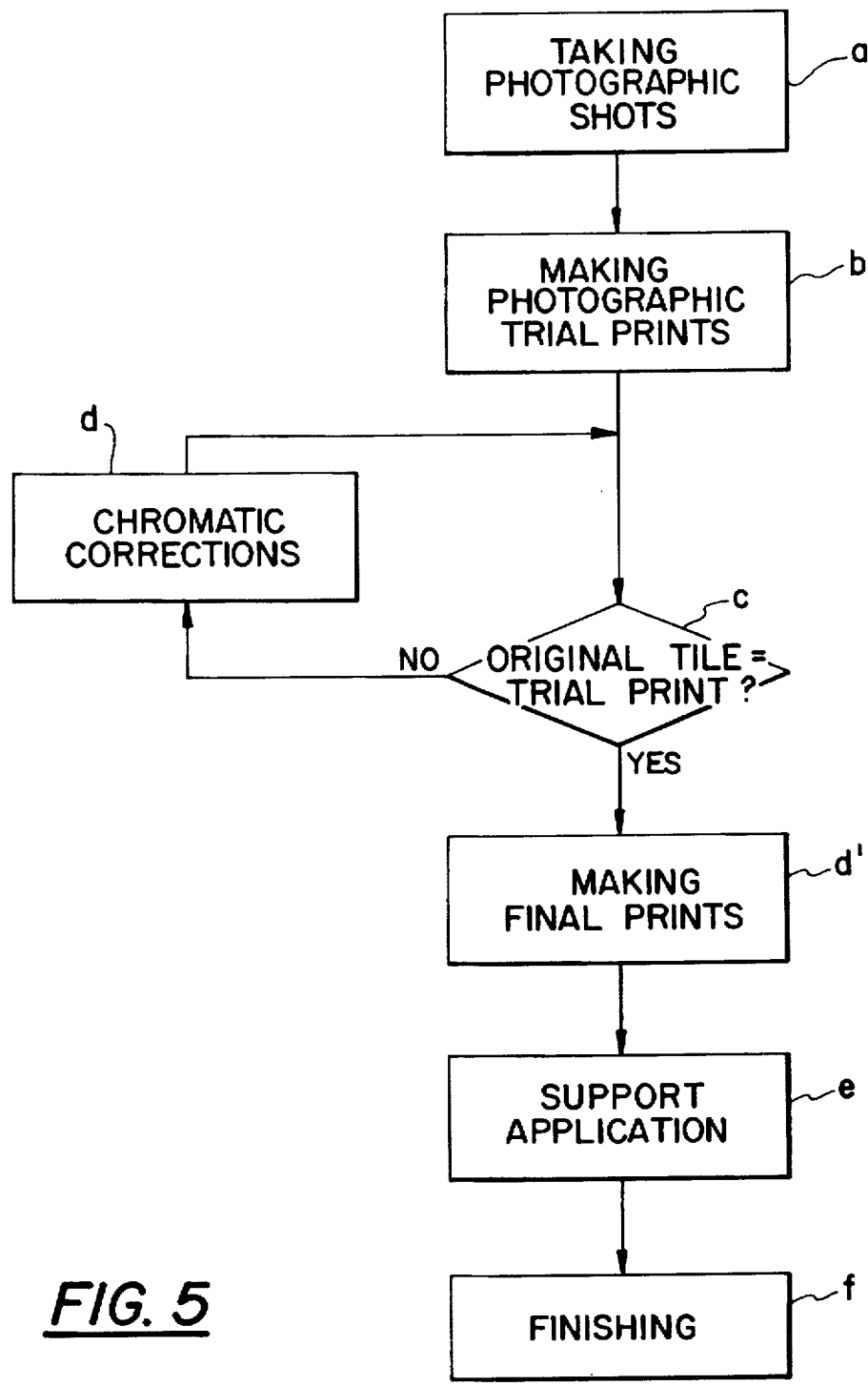
FIG. 5 is a block diagram of the main phases of the process of the invention.

FIG. 5 is a block diagram showing the main phases of the process of the present invention.

As it will now be apparent to a person skilled in the artistic and photographic fields, to which the present invention is related, the described process allows one to make replicas of old majolica tiles and the like, time-worn majolica tiles which are being often unique specimens of high historic and artistic value.

However it has to be pointed out that the above described process phases were given only as a non-limiting example and they may also be carried out in a sequence different from the described one. Moreover, the equipment, the materials and the products used may be different from those described in this specification and may be replaced by equipment, materials and products with similar characteristics, without departing however from the scope of the invention as set forth in the appended claims.

I claim:

1. A process for making a visually and tactually faithful replica of an old, time-worn majolica tile, comprising:
   (a) frontally photographing a selected old, time-worn majolica tile to obtain a photograph;
   (b) printing the photograph to obtain a trial print;
   (c) comparing the trial print with said selected tile;
   (d) if the trial print is chromatically faithful to the selected tile, accepting the trial print as a final print, but
   (d') if the trial print is chromatically unfaithful to the selected tile, correcting printing of the trial print, so as to obtain a corrected trial print which is chromatically faithful to the selected tile, and accepting the corrected trial print as a final print;
   (e) facially adhering the back side of the final photographic print to a front side of a three-dimensional support which has peripheral edges;
   (f) finishing said edges and the front surface of the final print by:
      (i) three-dimensionally distressing the front surface of the final print and the edges of the support to replicate defects in the selected tile, and
      (ii) providing the distressed edges of support with a coating which resembles the appearance of fired terracotta clay.

2. The process of claim 1, wherein:

step (f)(i) comprises cutting away portions of the support using a cutting tool; and step (f)(ii) comprises applying dye to said distressed edges.

3. The process of claim 2, wherein:

step (f)(i) further comprises forming at least one depression in the front surface of the final print corresponding to a site where glaze is missing on the selected tile; and step (f)(ii) further comprises applying said coating to said front surface in said at least one depression.

4. The process of claim 1, wherein:

step (a) comprises frontally photographing the selected tile from a location which is offset from directly in front thereof, using a camera which corrects for such offset.

5. The process of claim 1, wherein:

said support is made of porous polypropylene material.

6. The process of claim 1, wherein:

step (d) further comprises pressing the final print against the support in a press, with layers of glue spread therebetween on the back side of the final print and the front side of the support.

7. The process of claim 6, wherein:

said glue is an acetone-vinyl glue.

8. The process of claim 1, wherein:

in step (f)(ii) said coating is applied as an aqueous suspension of powdered stucco and brown acrylic dye.

9. A visually and tactually faithful replica of an old, time-worn majolica tile produced by the process of claim 1.

* * * * *